Figure 1:
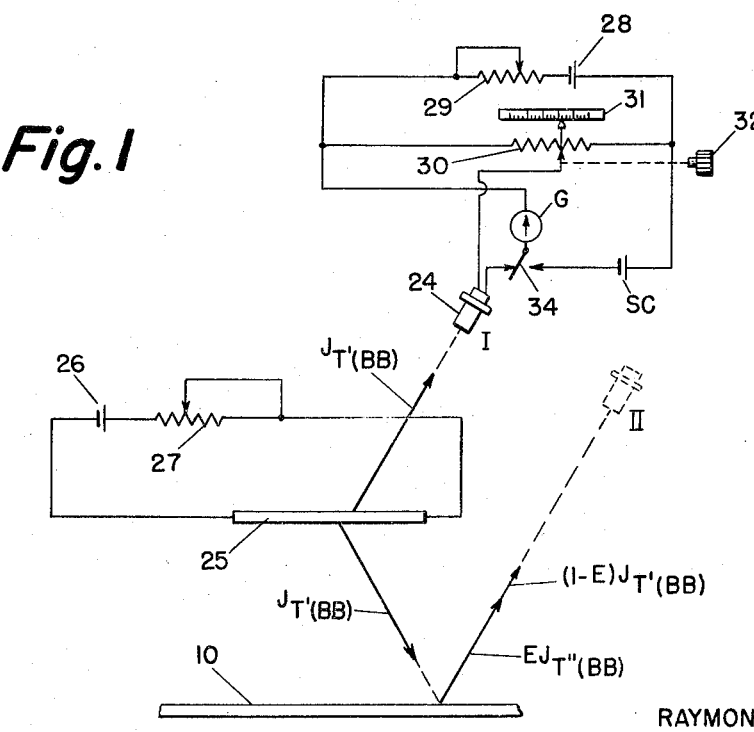

June 10, 1958     R. C. MACHLER     2,837,917
RADIATION SYSTEMS FOR MEASURING TEMPERATURE
Filed Feb. 7, 1950     5 Sheets-Sheet 1

INVENTOR.
RAYMOND C. MACHLER
BY
Woodcock and Phelan
ATTORNEYS

June 10, 1958      R. C. MACHLER      2,837,917
RADIATION SYSTEMS FOR MEASURING TEMPERATURE
Filed Feb. 7, 1950      5 Sheets-Sheet 2
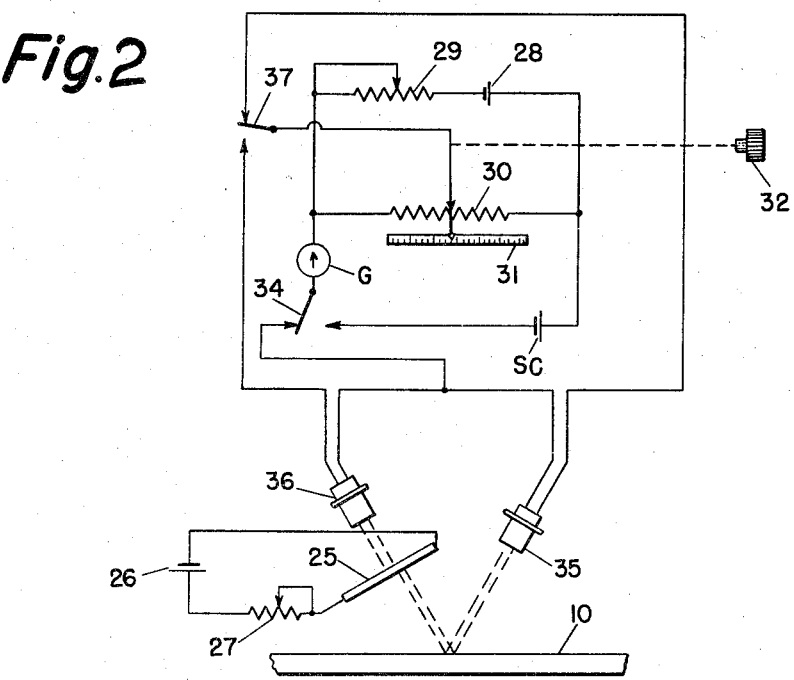
*Fig.2*
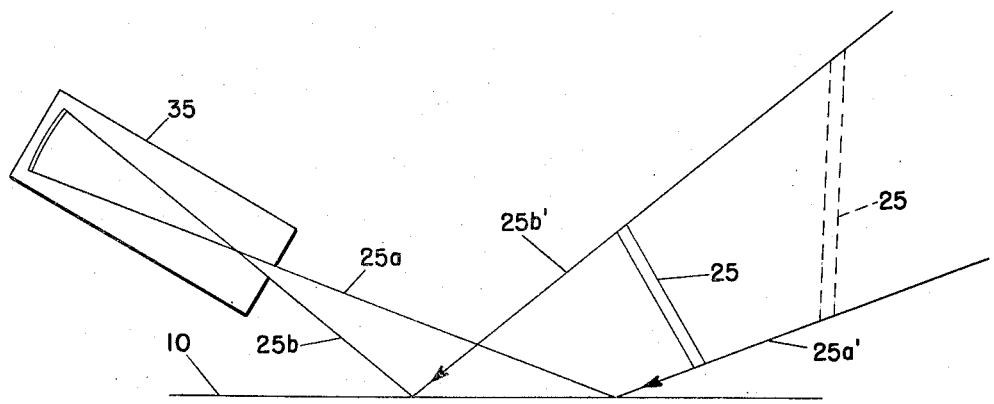
*Fig.2-A*
INVENTOR.
RAYMOND C. MACHLER
BY
Woodcock and Phelan
ATTORNEYS June 10, 1958 R. C. MACHLER 2,837,917
RADIATION SYSTEMS FOR MEASURING TEMPERATURE
Filed Feb. 7, 1950 5 Sheets-Sheet 4

*INVENTOR.*
RAYMOND C. MACHLER
BY
Woodcock and Phelan
ATTORNEYS

June 10, 1958 — R. C. MACHLER — 2,837,917
RADIATION SYSTEMS FOR MEASURING TEMPERATURE
Filed Feb. 7, 1950 — 5 Sheets-Sheet 5

INVENTOR.
RAYMOND C. MACHLER
BY
Woodcock and Phelan
ATTORNEYS

United States Patent Office 2,837,917
Patented June 10, 1958

2,837,917

RADIATION SYSTEMS FOR MEASURING TEMPERATURE

Raymond C. Machler, Philadelphia, Pa., assignor to Leeds and Northrup Company, Philadelphia, Pa., a corporation of Pennsylvania Application February 7, 1950, Serial No. 142,886

11 Claims. (Cl. 73—355)

This invention relates to systems for measuring the temperature of a body from which radiant energy is emitted and has for an object the provision of a temperature-measuring system of high accuracy and one whose accuracy is independent or substantially independent of non-uniform emissivity of the surface whose temperature is to be measured.

Heretofore, the determination in the open of the temperature of a surface of a non-black body by radiant energy responsive means has involved viewing an area of the body with an optical or total radiation pyrometer and introducing or applying an emissivity correction which often is approximate. Measurements made in accordance with the foregoing methods are, in general, subject to large errors because of the difficulties in determining the emissivity corrections to be applied. The particular corrections to be made will depend upon the character of the material under measurement and the conditions under which the measurements are made.

The foregoing will be particularly evident by considering a moving body or work surface, such as sheet material in the course of manufacture, new surface areas of which are continuously brought into range of view of a measuring device. The emissivity of such a body or work surface frequently changes in unpredictable manner because of physical differences in different areas of the work surface, changes due to the manufacturing operations, and changes in the surface viewed due to the presence of foreign materials, such as oils, waxes, dirt and the like, having emissivities differing from that of the underlying surface.

A perfect radiator, or black body, is characterized by the fact that the energy which it emits depends only on the temperature of the body. A non-black body radiator emits only a fraction of the energy emitted by a perfect radiator, the fraction being known as the emissivity of the body. The emissivity may refer to only a very narrow spectral range, such as is used in optical pyrometry, or a broad spectral range, such as is used in total radiation pyrometers. Thus, in order to relate the energy emitted by a non-black body to temperature, the emissivity must be known. The emissivity of an opaque body is related to its reflectivity by the equation $E+R=1$. When the emissivity is unity, the reflectivity is zero. However, non-black bodies are partial reflectors and their emissivity can never be unity. The total energy leaving an area of a non-black body surface will, in general, be partly emitted radiation and partly reflected radiation. Reflected radiation can cause temperature-measuring errors. For example, a sheet of white paper in daylight appears red hot when measured with an optical pyrometer. When the total of emitted and reflected radiation at every point in the spectral region to which the pyrometer is sensitive is the same as the radiation at every like point in the same spectral region as would be emitted by a black body at the same temperature, black-body conditions are said to exist.

Since in actual practice the opaque bodies or work surfaces whose temperatures are desired to be measured are not perfect black bodies, it follows that the radiation therefrom will not be due to the temperature of the work surfaces alone, since only a part of the radiation falling on them will be absorbed while the remainder will instead be reflected therefrom. Thus, the total radiant energy from a heated opaque work surface will be made up of two components, one due to emission which will be a fraction of the radiant energy which would be emitted from a black body at the same temperature as the work surface, and the other a reflected component due to the reflection of radiant energy from the work surface. When energy in each and all wavelengths utilized in actuating a radiant energy responsive temperature-measuring means has been made to equal the corresponding energy emitted by a black body at the same temperature as the work surface, black-body temperature-measuring conditions will have been attained.

It is an object of the present invention to provide apparatus for establishing true, or the equivalent of true, black-body conditions for the measurement of the temperature of a heated body, by black-body-calibrated radiant energy measuring means, which avoid entirely the need to apply corrections of any kind. It is also an object of this invention to provide systems for making more accurate temperature measurements of a body wherein a radiant energy responsive device may be used in the presence of radiation-absorption media between the surface and the point of observation thereof.

In carrying out the invention, as embodied in the several modifications hereinafter illustrated, means are provided for augmenting the radiant energy emitted by a non-black body or work surface with a component of radiant energy reflected by the surface so that the total effective radiant energy from the work surface is equal, or substantially equal, to that which would be emitted from the surface of a so-called black body at a temperature equal to that of the work surface.

It is a further object of the invention that the augmenting of the radiant energy emitted by the body with a reflected component be accomplished without producing a material change in the temperature of the body such as would produce a measurable or substantial error in measurement of the temperature thereof.

Figure 3:
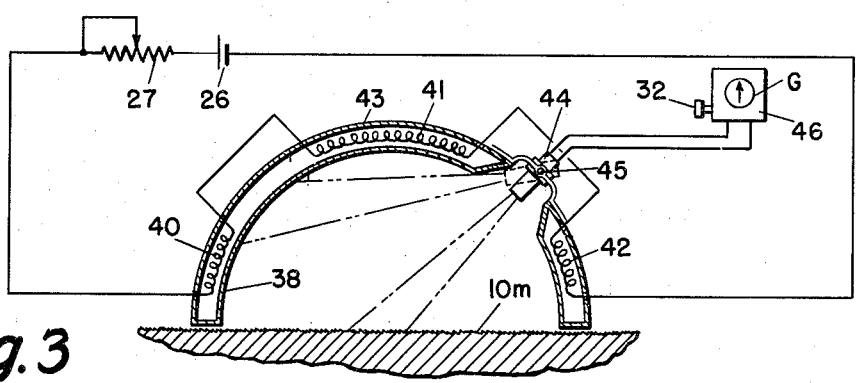
Figure 4:
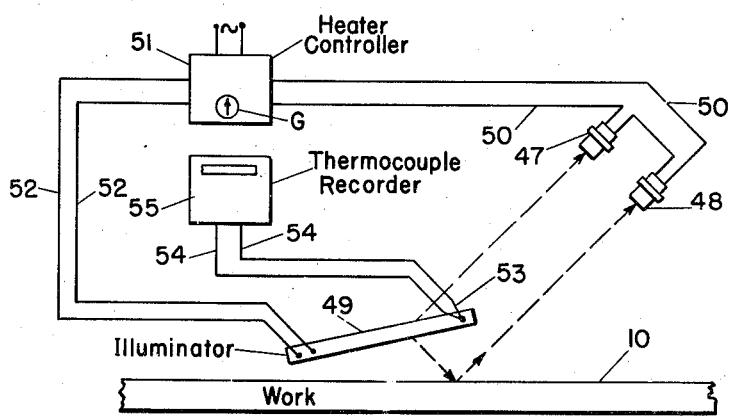
Figure 5:
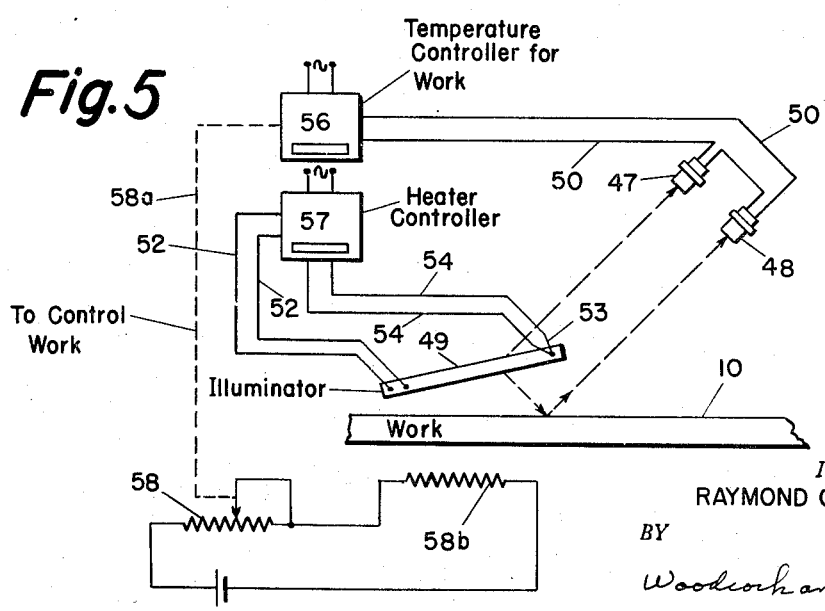
Figure 6:
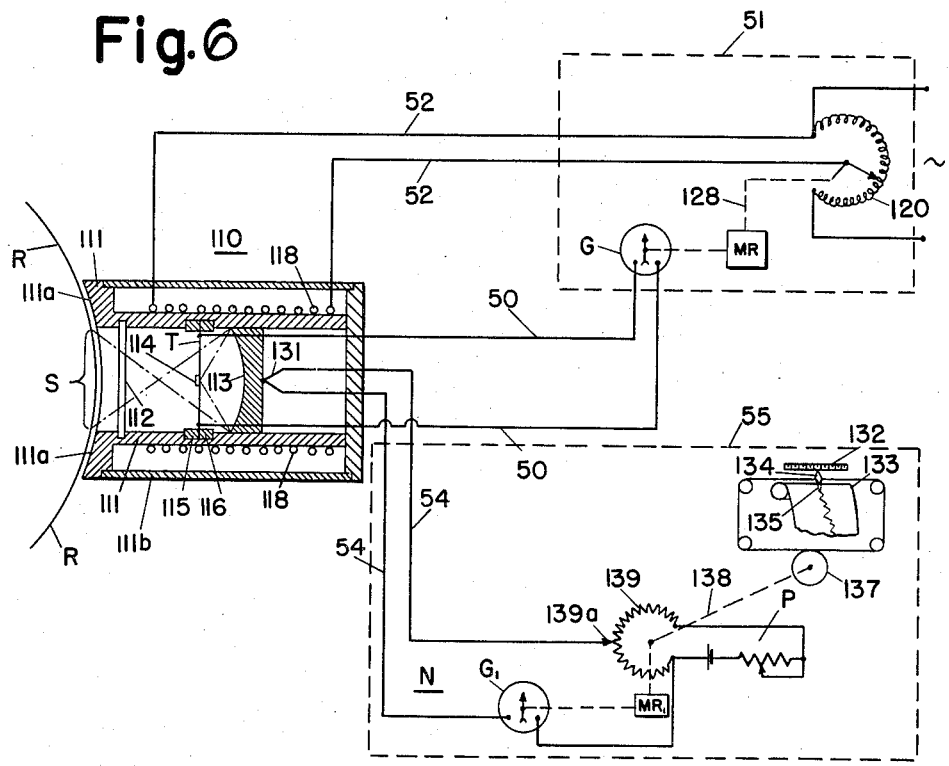
Figure 7:
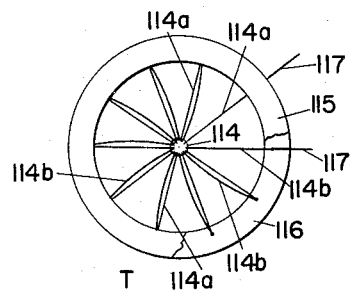
Figure 8:
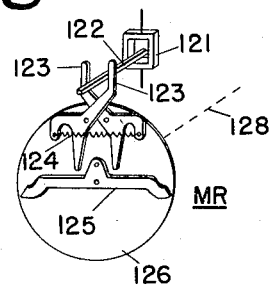
Figure 9:
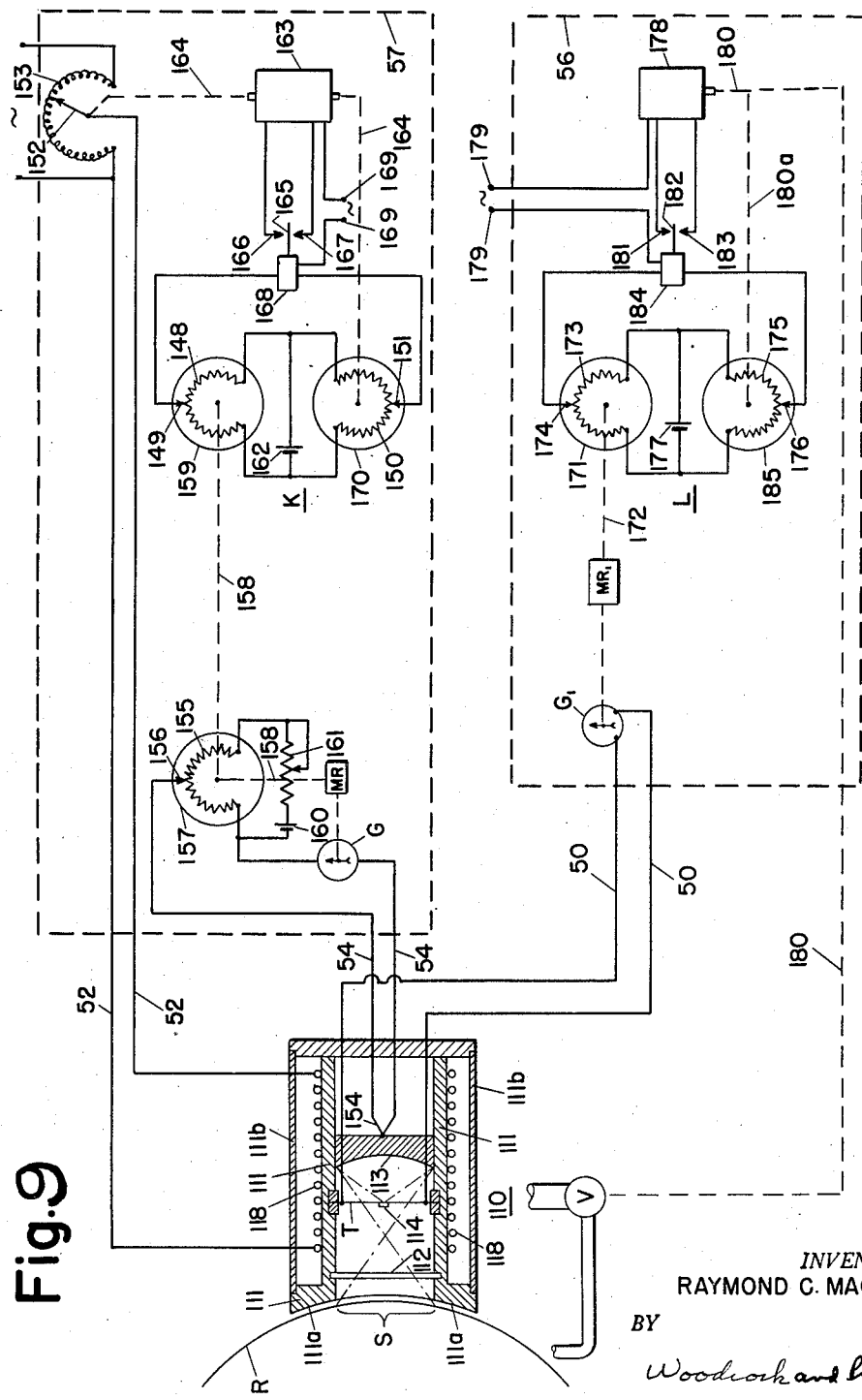

For further objects and advantages of the invention and for a detailed understanding of the several forms of the invention, reference is to be had to the following description taken in conjunction with the accompanying drawings, in which:

Fig. 1 diagrammatically illustrates one form of the invention including a black-body source of radiation;

Fig. 2 diagrammatically illustrates a modification of the invention along the same general lines as Fig. 1;

Fig. 2–A is an optical diagram applicable to several forms of the invention, particularly the modifications of Figs. 1 and 2;

Fig. 3 diagrammatically illustrates a further embodiment of the invention applied to a hemispherical source of black-body radiation;

Fig. 4 diagrammatically illustrates the application of the modification of Figs. 1 and 2 to an automatic temperature-measuring system;

Fig. 5 diagrammatically illustrates the general arrangement of Fig. 4 as applied to an automatic temperature-control system;

Fig. 6 diagrammatically illustrates a radiation pyrometer installation for automatically measuring the temperature of a surface independent of variations in the emissivity thereof;

Fig. 7 is a plan view of the thermopile unit of Figs. 6 and 9;

Fig. 8, in perspective, shows a fractional part of a mechanical relay mechanism diagrammatically shown in several figures; and Fig. 9 diagrammatically illustrates the present invention applied to a system for automatically controlling the temperature of a work surface.

In Fig. 1 the invention has been illustrated as applied to the measurement of a work surface 10 by means of a total radiation pyrometer 24 and a so-called black-body illuminator 25 which comprises a rectangular heating plate including heating resistors energized by a source 26 under the control of a heat-regulating device such as the resistor 27. The added source of radiant energy is designed for an emissivity as close as possible to unity in the region of the spectrum, where the principal sensitivity of the pyrometer exists for the temperature range under consideration. The total radiation pyrometer 24, a device well understood by those skilled in the art, may be of the type disclosed in Dike Patent No. 2,232,594. In the embodiment of Fig. 1 there has been avoided the need for an operator visually to compare the relative brightness of two surfaces. This has been accomplished by arranging the radiation pyrometer 24 for movement from a first position for viewing the black-body illuminator 25, and then to a second position for viewing the surface 10. The black-body illuminator 25, however, is disposed to direct radiation to the surface 10 for reflection therefrom to the radiation pyrometer when in its second position, shown by the broken lines. The radiation pyrometer 24 is connected in a measuring circuit, of any suitable type, shown as comprising a potentiometer including a source of supply 28, a variable resistor 29, slidewire 30 with associated scale 31, an adjusting knob 32 for slidewire 30 and the index for scale 31, and a measuring instrument illustrated as galvanometer G. A standard cell SC may be provided for calibrating or standardizing the network with the transfer switch 34 in its righthand position.

The operation is as follows: With the radiation pyrometer 24 in its first position, as at I, to view the black-body source 25, the knob 32 is turned to adjust the slidewire 30 to produce zero deflection of the galvanometer G. The radiation pyrometer is then moved to its second position, as at II. If the galvanometer deflects from its zero position, preferably midway of its scale, an indication will be had that the radiation from the surface 10 is not equal to that received from the black-body illuminator 25. If the radiation is less, the deflection will be in one direction, and if it is greater, the deflection will be in the opposite direction. Accordingly, the resistor or control device 27 is adjusted until the radiation received by the radiation pyrometer 24 in its first position is the same as in its second position. Of course, with each adjustment of resistor 27 a new adjustment of slidewire 30 by knob 32 will be required.

When the zero deflection of the galvanometer is maintained, upon movement of the radiation pyrometer from its first to its second position, or vice versa, there may be read directly on the scale 31 the true temperature of the surface 10. While in Fig. 1 the variable tap of slidewire 30 has been diagrammatically illustrated as adjustable, it will be understood that the resistor element of slidewire 30 may be, and ordinarily is, mounted upon a rotatable element for rotation relative to a fixed contact. The scale 31 may be either directly associated with the rotatable slidewire, or driving connections driven by knob 32 may be utilized to drive an indicator relative to an associated scale or to drive a pen relative to a chart.

In Fig. 1, the radiant energy from the black-body illuminator 25 is represented by the arrow or vector labeled $J_{T'(BB)}$, the subscripts indicating the radiant energy J is that from the black-body illuminator at the temperature T'. Similarly, the first arrow or vector from surface 10 labeled $EJ_{T''(BB)}$ represents the radiant energy emitted by the surface 10. This follows since the total energy of a non-black-body surface is equal to the energy J from a black-body surface at the same temperature T'' multiplied by the emissivity E of the non-black-body work surface, which of course is surface 10. The second vector or arrow from surface 10, the reflected component, added to the first is labeled $(1-E)J_{T'(BB)}$ and represents the radiant energy received by the surface 10 from the black-body illuminator 25 which is not absorbed but is reflected therefrom. As indicated by the designation, the reflected component is equal to the product of the total energy which would be radiated by a black body at the temperature T' of the black-body illuminator 25 multiplied by the reflectivity, which, of course, is equal to $1-E$. If the temperature T' of the black-body illuminator 25 be brought to the same temperature T'' as the work surface 10, then $$EJ_{T''(BB)} + (1-E)J_{T'(BB)} = J_{T''(BB)} = J_{T'(BB)}$$

From the foregoing it will be seen that the total radiation from the work surface 10, that is the sum of the emitted and reflected components, is equal to the radiation of a black body at the temperature T'' of work surface 10. Thus, the true temperature of surface 10 will be indicated on the scale 31 whether the pyrometer be receiving radiation from the work surface 10 or from the black-body illuminator 25.

It is to be noted that the source 25 of radiant energy must closely approximate the characteristics of a black-body illuminator in the spectral region of sensitivity of the radiation pyrometer. The black-body illuminator 25 may take the form of electrical heating resistors enclosed by a copper housing having a highly oxidized surface. The black-body illuminator may also be formed of carbon having resistors in heating relation therewith, preferably embedded therein, or the carbon itself may be used as the heating element.

Inasmuch as it may be inconvenient to move the radiation pyrometer 24 of Fig. 1 from one to the other of its positions, and inasmuch as such a measuring system would ordinarily require a slidable mounting arrangement for the pyrometer, the system of Fig. 2 may be preferred in which there are provided matched total radiation pyrometers 35 and 36, the first receiving radiant energy emitted and reflected from the work surface 10 and the second receiving radiant energy from the black-body illuminator 25. By means of a transfer switch 37, the potentiometer measuring circuit is connected first to the radiation pyrometer 35 and then to the radiation pyrometer 36.

The radiation of the black-body illuminator 25 is varied by adjustment of resistor 27, and knob 32 is adjusted to balance the potentiometer measuring circuit. The related adjustments are continued until the galvanometer G remains at zero with either radiation pyrometer 35 or radiation pyrometer 36 connected to the measuring network. In the modification of Fig. 2 it will, of course, be understood that radiation pyrometers 35 and 36 are preferably matched with regard to the optical elements so that equal output voltages are obtained when sighted upon the same source of radiation. In some instances, depending upon the measuring means used, a match of the output-characteristics of the pyrometers as viewed by the measuring network is desirable. Both radiation pyrometers should be substantially free from the effect of ambient temperature since they may not be subject to exactly the same ambient temperature fluctuations.

In the several forms of the invention which have been described, there has been a tacit assumption that the work surface 10 is specular (the surface will reflect an image) and flat, that is to say, the component of radiant energy reflected from the surface 10 will fulfill the requirements $(1-E)J_{T'(BB)}$ from the illuminator. Since in everyday practice the work surface will not be flat in an optical sense, additional provisions are desirable. From the standpoint of the radiation pyrometer 35 of Fig. 2, the black-body illuminator 25 should be large enough, in surface area, so that the extreme rays from the work surface 10 entering the radiation pyrometer 35 shall be provided by the illuminator 25. When the foregoing condition is satisfied, assurance is had that all or most of the radiation received by the radiation pyrometer, due to reflection from the work surface 10, will be from the black-body illuminator 25.

The foregoing requirements may be readily met as illustrated in Fig. 2–A, where the cone of radiation received by the radiation pyrometer 35 is defined by the solid angle of reflection defined by the two extreme rays 25a and 25b. If the surface is flat and specular the area of the illuminator need only be coextensive with a selected cross-sectional area of a similar cone of rays defined by the extreme rays thereof, 25a' and 25b'. For example, the black-body illuminator, or radiator, 25, if disposed as illustrated by the solid lines, may be relatively small. However, a much larger illuminator as indicated by the broken lines, may be located at other than a right angle with respect to a central line midway of 25a' and 25b', provided the area shall be great enough to cover the extreme limits of the extreme rays 25a' and 25b'. As the work surface varies from a plane surface to a convex surface, the needed area of the black-body illuminator increases rapidly because of the wider divergence of the two extreme rays required from the illuminator to provide the extreme rays 25a and 25b entering pyrometer 35.

When it is desired to measure the temperature of work surfaces of a diffusing or matte character, it will be desirable to utilize the modification of the invention illustrated in Fig. 3. It will be assumed that the matte work surface 10m will diffuse the radiant energy received from a black-body illuminator. Accordingly, radiant energy from an illuminator of small area, as illuminator 25 of Fig. 2–A, will be scattered in all directions and the small reflected component between the extreme limits of the rays in the above modifications will be insufficient to produce the required reflected component to establish black-body conditions of measurement.

In Fig. 3, the work surface 10m has been illustrated as a matte surface. By providing a black-body illuminator 38 of hemispherical character, which is preferably supported above the surface 10m with a minimum spacing between it and the matte surface, the problem of diffusion of radiant energy will be solved.

It is to be observed that the area viewed by the radiation pyrometer 44 is approximately at the center of the enclosing hemisphere. Thus, the hemispherical enclosure 38 assures that the black-body illuminator will not only be coextensive with the extreme rays received by the radiation pyrometer 44, but also will supply to the area viewed by the radiation pyrometer 44 the necessary energy so that the component reflected thereby will be that which will establish the black-body conditions of measurement when the output of the radiation pyrometer 44 is the same viewing either the illuminator 38 or surface 10. That the foregoing result is attained will be evident from the following considerations. The area from which the completely diffusing surface 10m receives radiant energy is equal to that of the hemisphere 38 disposed over and enclosing that area. By providing the hemispherical black-body illuminator 38, which is regulated to be at the same temperature as the work surface 10, the effective radiation in any one direction within the enclosure 38 is the same as that in any other direction and is equal to that emitted by a so-called black body at the temperature of surface 10m since every element of the surface 10m receives radiation from the hemispherical black-body illuminator 38 and a component is reflected by each of these surface elements of a magnitude dependent upon $(1-E_{10m})$ where $E_{10m}$ is the emissivity of the surface 10m.

The black-body illuminator 38 is provided with heater coils 40, 41 and 42 schematically illustrated as disposed in a housing 43 and connected in an energizing circuit including the adjustable resistor 27 and a source of supply 26. A total radiation pyrometer 44 is pivotally mounted as at 45 for rotation first to view the work surface 10m and then to view the black-body illuminator 38. The radiation pyrometer 44 is connected to the measuring system diagrammatically indicated by the rectangle 46 which may, of course, be of the same type as illustrated in Fig. 1, having adjusting knob 32. The temperature of the black-body illuminator 38 will be adjusted by the control device or resistor 27 until the galvanometer G will read the same, ordinarily zero, with the pyrometer directed at the black-body illuminator 38 or the work surface 10m.

While the present invention has been described so far in connection with manually operable systems for measuring the temperature of a work surface, it is to be understood that it is also applicable to automatic measuring systems. One form of an automatic measuring system has been shown in Fig. 4 in which there are provided differentially connected matched total radiation pyrometers 47 and 48, the first receiving radiant energy from the black-body illuminator 49 and the second receiving radiant energy emitted and reflected from the work surface 10. The output leads 50 from the differentially connected pyrometers are connected to a heater controller which has been diagrammatically indicated by the rectangle 51 and which will hereinafter be described more in detail in connection with Fig. 6. Leads 52 from the black-body illuminator or heater strip 49 are also connected to the heater controller 51. Whenever unequal intensities of radiation are received by the radiation pyrometers 47 and 48 the heater controller 51 varies the input to the black-body illuminator 49 in such a direction and to such an extent as may be necessary to equalize the intensities of the effective radiant energy received by each of the radiation pyrometers 47 and 48. When the intensities of radiation received by the pyrometers 47 and 48 are equal, the input to the black-body illuminator or heater strip 49 will remain constant until such time as a condition of inequality again exists. Since the heater strip 49 is a black-body illuminator the radiation pyrometer 47 may be utilized directly to determine the temperature of the illuminator after establishment of the aforesaid equality. However, an alternate method has been shown in Fig. 4 in which a thermocouple 53 has been imbedded in the surface of the black-body illuminator 49 and its output leads 54 have been connected to a thermocouple recorder diagrammatically illustrated in the form of a rectangle 55. As in the case of the heater controller the thermocouple recorder will be hereinafter more completely described in connection with Fig. 6.

When equal intensities of radiation are received by pyrometers 47 and 48, as will be indicated by a null deflection of the detector or galvanometer G, the black-body illuminator 49 and the work surface 10 will be at the same temperature. Therefore, the temperature of the black-body illuminator may be measured by any suitable temperature-responsive device, as the thermocouple 53, and such measurement will be of the temperature of a body which is a replica of the temperature of the work including its surface 10.

The modifications of Figs. 4 and 5 have the advantage of making the temperature measurement independent of the presence or absence of media such as smoke, fumes, and the like, between the radiant energy detectors 47 and 48, the surface 10 of the work, and the illuminator 49. In practice, it is to be understood that the detectors or radiation pyrometers 47 and 48 are placed close together in order that the paths for the radiant energy thereto will be equally affected by intervening media. The measurement of the temperature of work surface 10 is unaffected by such intervening media, since in Fig. 4 the sole function of the detectors and the controller 51 is to control the illuminator 49 until the beams of radiant energy received by detectors 47 and 48 are equal.

The present invention is not only applicable to automatic temperature measuring systems but is also applicable to systems for automatically controlling the temperature of a body or work surface. One form of an automatic temperature control system for controlling the temperature of the work surface 10 has been shown in Fig. 5. In this system the differentially connected radiation pyrometers 47 and 48 have been connected by the output leads 50 to an automatic controller for controlling the temperature of the work which has been diagrammatically illustrated by rectangle 56. The radiation pyrometers 47 and 48 will be positioned in the manner set forth in connection with Fig. 4, the first receiving radiant energy from the black-body illuminator 49 and the second receiving radiant energy emitted and reflected from the work surface 10. In this modification the leads 54 of the thermocouple 53 and the leads 52 from the black-body illuminator 49 are both connected to a heater controller which has been diagrammatically illustrated by rectangle 57.

While the temperature controllers for the work surface 10 and the block-body illuminator 49 have been diagrammatically illustrated by the rectangles 56 and 57 in Fig. 5, their specific construction will hereinafter be described more in detail in connection with Fig. 9.

The temperature at which the body or work surface is to be controlled may be preselected and the temperature of the black-body illuminator 49 is then brought up to the preselected temperature by varying the energization of the resistors embedded therein. The thermocouple 53 is embedded in the surface of the heater strip 49 and provides a direct indication of its temperature. When the temperature of the black-body illuminator or heater strip 49 deviates from the preselected magnitude, such deviation is immediately detected by the thermocouple 53 which in turn energizes the heater controller, designated by rectangle 57, for returning the temperature of the black-body illuminator to the original preselected magnitude. In this manner the temperature of the black-body illuminator 49 is maintained at a preselected value.

As long as the intensity of the radiant energy received by the pyrometer 47 from the black-body illuminator 49 is equal to the intensity of the radiant energy received by the pyrometer 48 as emitted and reflected from the work surface 10, the temperature of the black-body illuminator 49 and the temperature of the work surface 10 are equal to each other and to the preselected magnitude. When the temperature of the work surface 10 deviates from the preselected magnitude, such deviation will be detected as a result of a lack of equality in the effective radiant energy beams, thus actuating the controller 56 and a correction will automatically be made in the heat supply to the work surface 10, as indicated by the control device 58 actuated through mechanical connection 58a. This correction will be made in the direction and to the extent necessary to bring the temperature of the work surface 10 back to the preselected temperature. The radiation pyrometers 47 and 48 will again receive equal intensities of radiation.

The source of heat supply for the work surface 10 may be of any suitable form, for example, such as steam or electric heating. In the case of steam heating, the supply of steam may be controlled by means of a valve in the supply line, as illustrated in Fig. 9. In the case of electric heating, variable heating resistors as illustrated may be utilized to vary the generation of heat. The mechanical connection 58a is connected so as to adjust resistors 58 to vary the energization of the heating coils or resistors 58b.

In the modifications of Figs. 4 and 5 it is to be understood that the differentially connected radiation pyrometers 47 and 48 are to be matched as regards their optical characteristics so that each will deliver the same electromotive force when sighted on the same source, and if desired their output impedance characteristics may be matched. Both radiation pyrometers should be free from the effect of ambient temperature. The black-body illuminator 49 may be similar in construction to the black-body illuminator 25 previously described in connection with Figs. 1 and 2 or it may comprise the hemispherical illuminator 38 of Fig. 3.

Where it is desired to measure the temperature of work surfaces having a matte surface, or one of extreme curvature, advantage may be taken of constructional principles developed in connection with Fig. 3. By making use of an enclosing structure wherein the effective radiation in any one direction within the enclosure is the same as that in any other direction, it is possible to use a small compact illuminator. In accordance with a further modification of the invention, such a structure has been combined with an improved radiant energy detector of the thermocouple type. Fig. 6 not only illustrates the new features of construction but also illustrates the invention as applied to a system for automatically measuring and/or recording the surface temperature of a heated roll in avoidance of errors due to emissivity and errors due to absorption of radiant energy by intervening media.

In Fig. 6 there is disclosed a radiation pyrometer 110 having a tubular housing 111 closed at the rear to form a thermopile chamber and with the open end thereof provided with a surface 111a complementary to the cylindrical surface of the hot body or roll R. The radiation pyrometer is securely mounted by suitable means (not shown) closely adjacent the roll R so that there is formed with the surface S of the roll R a closed cavity. The housing 111 of the pyrometer 110 is preferably of a good heat-conducting material such as aluminum. Radiation from the surface S passes into the cavity, thence through a passage or window 112 of mica, fluorite or like material, transparent to infra-red, and is directed by a metallic concave mirror 113 upon a target 114 of a radiation sensitive device illustrated in the form of a thermopile T which is within the thermopile chamber. The target 114 is located at the image point of the surface S. The thermopile T may be similar to the type shown in Dike Patent 2,232,594 and comprises a plurality of thermocouples, Fig. 7, the hot junctions of which are in intimate heat-conducting relation with the target 114, and the cold junctions of which are in intimate heat-conducting relation with a supporting or clamping structure 115, 116 of heat-conducting material which rests within a groove in the housing 111 in good thermal contact therewith. The thermocouple wires 114a, 114b and connections are electrically insulated from the metal target disc 114 and the clamping rings 115, 116.

The open mouth of the housing 111 is designed with a shape complementary to that of the surface S viewed by the mirror 113 of the thermopile T, and the open end of the housing 111 is preferably extended to overlap the surface of the roll R beyond the particular surface area S viewed by the mirror 113 to prevent entry of any foreign radiation into the cavity and into the thermopile chamber in which the thermopile T is located. As a further precaution against the entry of foreign radiation into the cavity, the surface 111a is provided with a formed absorbing surface for absorbing any radiation which falls upon it. This surface may be blackened or roughened in a manner such that its absorbing qualities will approach that of a black body.

In addition to the foregoing structural features, there is provided an adjustable heat transfer means or heater coil 118 in intimate thermal contact with the housing 111 for controlling the temperature thereof in the following manner. Since the cold junctions of the thermocouples of the thermopile T are also mounted in intimate thermal-conducting relation with the housing 111, there will be no temperature difference between the hot and cold junctions of the thermopile, and, hence no potential output from the thermopile if the hot junction target area 114 and the housing and the "cold" junctions are at the same temperature. If the temperature of the hot junction target area 114 changes or that of the housing changes so that the temperatures are no longer equal, the hot and cold junctions of the thermopile T will like be at different temperatures and an electromotive force will appear between the output terminals 117, Fig. 7, which are connected to the leads 50, Fig. 6, of a magnitude and of a polarity dependent upon which group of junctions is at the higher temperature. The output from the thermopile T is used for the control of the energization of the heating coil 118 in a manner such that the temperature of the housing 111 and the cold junctions may be made to equal that of the hot junction area 114, as will be later explained in detail.

Radiant energy comprising energy emitted by the surface S and a reflected portion of energy received by the surface S from the housing 111, is concentrated by the mirror 113 on the target 114. The maximum temperature of the target for a given highest temperature in the system will be attained when isothermal conditions exist within the cavity at which time the stream of radiation in any given direction must be the same as in any other direction regardless of the materials bounding the cavity or materials within the isothermal enclosure. That is to say, when the housing 111 and the surface area S are at the same temperature, blackbody conditions exist and the temperature of the target 114 will be at its maximum temperature so that the energy concentrated thereon will be offset by radiation from the target and the hot and cold junctions of the thermopile will be at the same temperature. Under these last-mentioned conditions the thermopile will not generate an electromotive force but will have zero output.

The several thermocouples which preferably are connected in a series-accumulative relation are conducted by lead wires 50, 50 to a sensitive device such as the galvanometer G. The galvanometer G, Fig. 6, may form a part of a mechanical relay MR of the type disclosed in Squibb Patent 1,935,732, and symbolically illustrated in Fig. 8, which responds in accordance with deflections of the galvanometer G to adjust through a mechanical connection 128 a variable transformer 120, Fig. 6, available on the market under the trade-name "Variac," for adjusting, through the leads 52, 52, the heating effect of the coil 118. A detailed description of the operation of such a relay will be found in the aforementioned Squibb patent. Briefly, the deflection of the galvanometer coil 121, Fig. 8, in one direction or the other positions the point 122 between a pair of feeler members 123, 123. By a suitable cam and clamping mechanism (not shown), the feeler members 123, 123 are actuated to position a clutch member 125 with reference to a disc 126 in accordance with the deflection of the pointer 122. After deflection of the clutch member 125, it is moved into engagement with the disc 126. Thereafter, the restoring cams (not shown) return the clutch member 125 to the position illustrated and, at the same time, rotate the disc 126 and the shaft, diagrammatically illustrated by the broken line 128, in accordance with the deflection of the galvanometer pointer. The arrangement is such that the temperature of the cold junctions, that is, the temperature of the housing 111, is maintained equal to the temperature of the hot junctions at the target 114. The foregoing equipment for controlling the temperature of the heater coil 118 has been illustrated more in detail in Fig. 6 within the enclosure of a rectangle 51 which has hereinbefore been generically referred to as a heater controller or regulating means.

When the aforesaid isothermal conditions have been attained, that is, the temperature of the housing 111 of the pyrometer equal to the temperature of the surface area S, the stream of radiation in any given direction within the cavity will be the same as in any other direction. The foregoing follows irrespective of the material which may form the isothermal enclosure, and thus it is not necessary that the housing 111 be of the same material as the surface S or that the clamping rings 115, 116 be of the same material as the housing 111. It is necessary that the walls and the contents of the housing be at a common temperature, and thus it follows that the cold junctions of the thermocouples are designed to be in good thermal contact or good heat transfer relation with the housing 111, and they are deliberately heated along with the housing to equal the temperature of the hot junctions of the target 114. Accordingly, the temperature of the housing 111 is made equal to the temperature of the surface S and the measurement of the temperature of the stationary housing 111 is a simple matter.

The temperature of the housing 111 may be readily measured by attaching thereto at any suitable location, such as at the rear wall, a thermocouple 131 connected by lead wires 54, 54 to any conventional measuring system N, such as one including a galvanometer $G_1$, a potentiometer P, and a mechanical relay $MR_1$ for relatively adjusting the slidewire 139 relative to its associated contact 139a, at the same time rotating a driving pulley 137 on shaft 138 to move a pointer 134 relative to the scale 132 and a pen 135 relative to a chart 133, both to indicate and record the temperature of the surface S in terms of the temperature of the housing 111. The foregoing equipment for indicating and recording the temperature of the surface S has been illustrated more in detail in Fig. 6 within the enclosure of a rectangle 55 which has hereinbefore been generically referred to as a thermocouple recorder.

The heating coil 118 may be disposed in a chamber closed by a cylindrical wall 111b which may be of a thermal conducting material or for high temperature operation may preferably be of a heat-insulating material. The establishment of black-body conditions within the isothermal enclosure for the thermopile T eliminates the effects of variations in emissivity of the roll R, variations due to the presence of absorbing gases or vapors in the line of sight and other factors, other than temperature, which would tend to change the output of the thermopile. Such variations do not affect the output of the thermopile T since the gases and vapors and the like in the line of sight are necessarily within the enclosure or chamber and, hence, are at the black-body temperature.

The provision of the shape of the open end of the radiation pyrometer 110 complementary to that of the roll R, together with the absorbing surface on the surface or peripheral area 111a, eliminates to a very high degree the entry of any radiation from any source other than the roll. Moreover, the relatively wide surface 111a which extends along and in close relation with the roll R brings the thin layer of gas or atmosphere between the roll R and the thermopile housing 111 to approximately the temperature of the roll R. Thus, the temperature of the roll R, which is at a uniform temperature, and the temperature of the gas in the narrow space between the roll R and the housing 111, and the temperature of the housing 111 are all at substantially the same temperature. Under these conditions the total effective radiant energy comprising the emitted component of radiant energy from the surface S plus the reflected component therefrom supplied by the housing 111 will be equal to the energy which would be emitted by a black body at the temperature of the roll R regardless of the emissivity of the surface area S, and further any absorbing media within the enclosure will be at the temperature of the enclosure so that the sum total of energy emitted, transmitted, and reflected from the media will likewise be equal to that which would be emitted by a black body at a temperature equal to that of the roll.

Again summarizing the foregoing, it may be said that there is established the equivalent of black-body conditions in which the temperature of the housing 111 will become a true measure of the temperature of the area S of roll R when there is zero output from the thermopile T, and this temperature may be readily and conveniently measured by the stationary thermocouple 131 secured in intimate thermal relation with a wall of the housing 111, shown as formed by the partition including mirror 113.

Referring to Fig. 9, the radiation pyrometer 110 has been shown in connection with a system for automatically controlling the surface temperature of the roll R. By preselection of the temperature of the housing 111 and maintaining it constant throughout the control period the temperature of the cold junctions of the thermopile T also will be of the same constant magnitude throughout the control period due to the good thermal contact of the cold junctions with the housing 111 as previously described. As long as the temperature of the cold junctions of the thermopile T and the temperature of the hot junctions at target 114 are the same, the pyrometer housing 111 and the surface S of the roll R will be at equal temperature. Any variation in the temperature of target 114 which will result when there has been a variation in the radiation received thereon will indicate a corresponding variation in the surface temperature of roll R.

For maintaining constant the preselected temperature of the pyrometer housing 111, there may be provided a suitable control system, such as for example, a control system of the proportional or position-adjusting type as disclosed in the Davis Patent 2,300,537. If preferred, the control system may be of the duration-adjusting type also shown in the above mentioned Davis patent and in the Davis Patent 2,325,232.

There have been shown in Fig. 9 and generically indicated by rectangle 57 a thermocouple recorder and a proportional type controller for controlling the temperature of pyrometer housing 111. The more elaborate control refinements such as reset or automatic droop correction of the Davis patents have been omitted solely for the purpose of simplicity. Also omitted are the chart and associated parts of the recorder; however, they may be seen in a corresponding position in Fig. 6 as represented by parts 132—138. It is to be understood such provisions will ordinarily be included. The network K comprises a slidewire 148 whose position with respect to its contact 149 corresponds with the temperature of the pyrometer housing 111 and a slidewire 150 whose position with respect to its contact 151 corresponds with the setting of contact 152 of the variable transformer 153 for varying the heating effect of the coil 118 in pyrometer housing 111.

The temperature-responsive device for positioning contact 149 with respect to slidewire 148 in accordance with the temperature of pyrometer housing 111 has been shown as a self-balancing potentiometer arrangement in which the voltage produced by the thermocouple 154, in thermal contact with pyrometer housing 111, is automatically balanced against the effective voltage of potentiometer slidewire 155. Whenever there is a variation in the temperature of pyrometer housing 111, the galvanometer G deflects to effect, through the mechanical relay mechanism MR previously described in connection with Fig. 8, adjustment of the potentiometer slidewire 155, with respect to its contact 156, in such sense and to such extent that the thermocouple voltage is again balanced. The disc 157 upon which slidewire 155 is mounted is coupled, as by shaft 158, to the disc 159 upon which slidewire 148 of network K is mounted, so that each different position of contact 149 with respect to slidewire 148 corresponds with a different temperature of the pyrometer housing 111.

The current for the slidewire 155 of the potentiometer is derived from a battery 160 and is maintained at a constant value, that value for which slidewire 155 is calibrated, by variation of the rheostat 161. Standardization may be effected by means of a standard cell and switching arrangements not shown.

Any suitable source of current either direct or alternating may be provided for network K; however, a direct current source has been shown as illustrated by battery 162.

A reversible motor 163, of any suitable type, is connected through shafting and gearing, diagrammatically illustrated by broken line 164, to the movable contact 152 of variable transformer 153 and is controlled by a reversing switch comprising contacts 165, 166 and 167 operated in response to unbalance of the network K by the relay 168 of any suitable type such as a contact galvanometer. The motor 163 may be energized from any suitable source of current connected to its input terminals 169, 169. The motor 163 also is mechanically coupled, illustrated by broken line 164, to the supporting disc 170 for the slidewire 150 to effect, upon unbalance of network K, adjustment of slidewire 150 with respect to its contact 151 in the sense required to restore the network K to balance.

For purpose of explanation, it will be assumed that when the temperature of pyrometer housing 111 is at the preselected magnitude, the contact 149 is in engagement with the midpoint of slidewire 148 and that slidewire disc 159 is moved in a clockwise direction as the temperature falls, and in a counterclockwise direction as the temperature rises. The relative position of slidewire 148 and contact 149 which corresponds with the preselected temperature is commonly referred to as the control point. To change the control point, provision is made for relative adjustment of slidewire 148 relative to its contact 149 without movement of shaft 158. Thus a scale (not shown) may be provided for slidewire 148 to assist in selecting the control point for a selected temperature.

Briefly, in describing the operation of this control system, upon a change in the temperature of the pyrometer housing 111, the network K is unbalanced by movement of the slidewire 148 to a position corresponding with the extent of the temperature change and is rebalanced by adjustment of the slidewire 150 concurrently with adjustment of movable contact 152 of the variable transformer 153 by the motor 163. Thus, for a given set of ambient conditions it is seen that for every temperature of the pyrometer housing 111 there is a corresponding position for contact 152 of the variable transformer 153.

The temperature of the work surface S is controlled in accordance with the preselected temperature of the pyrometer housing 111 by a suitable automatic control system which may be, for example, of the position-adjusting type or duration-adjusting type as disclosed in the Davis patents mentioned above. For simplicity it has been shown as of the position-adjusting type as diagrammatically indicated by rectangle 56, Fig. 9, and it is similar to the system provided for controlling the temperature of the pyrometer housing 111.

In the controller 56, Fig. 9, the output leads 50, 50 from the thermopile T are connected directly across the galvanometer $G_1$, and as will be seen the potentiometer circuit has been omitted. Also, a steam valve V is shown as the final control element. The mechanical relay $MR_1$, under the control of galvanometer $G_1$, is mechanically coupled to slidewire disc 171 as diagrammatically indicated by broken line 172. The network L comprises a slidewire 173, mounted on disc 171, whose position with respect to its contact 174 corresponds with the temperature of the controlled surface S of the roll R and a slidewire 175 whose position with respect to its contact 176 corresponds with the position of valve V for varying the heat input to the roll R. While the final control element has been shown as a steam valve V, it is to be understood that other suitable heating or cooling means may be used for varying the temperature of the roll R or other surface to which the invention may be applied.

The current for network L may be either direct or alternating and has been shown as being derived from a direct current source battery 177.

A reversible motor 178 energized by a suitable source of current connected to its input terminals 179, 179 is mechanically connected, diagrammatically illustrated by broken line 180, to valve V and is controlled by a reversing switch comprising contacts 181, 182, and 183 operated in response to unbalance of the network L by the relay 184 which may be any suitable type such as a contact galvanometer. The motor 178 also is mechanically coupled, generically shown by broken line 180a, to the supporting disc 185 for the slidewire 175 to effect upon unbalance of network L adjustment of slidewire 175 with respect to its contact 176 in the sense required to restore the network L to balance.

As long as the controlled surface S of the roll R remains at the same temperature as the pyrometer housing 111, the network L will continue to be balanced and valve V will remain in a stationary position. Upon a change in temperature of surface S, the intensity of radiation received by the target 114 of the thermopile unit T also will be changed and there will be a resultant change in the temperature of the hot junctions of the thermopile T. The temperature of the hot junctions and the target 114 of the thermopile will no longer be the same as the temperature of the cold junctions of the thermopile and the housing 111. Thus, an electromotive force will be produced by the thermopile resulting in a deflection of galvanometer $G_1$, the sense of deflection depending upon the polarity of the electromotive force produced by thermopile T. Under the control of galvanometer $G_1$ the mechanical relay $MR_1$, will rotate disc 171 to a position whereby the resulting position of its slidewire 173 will correspond with the extent of the temperature change. Upon the occurrence of this unbalance of network L, relay 184 will close the contacts 182 and 181, or 182 and 183 depending upon the sense of unbalance, thereby energizing motor 178 to rebalance circuit L by adjustment of the slidewire 175 concurrently with adjustment of valve V. In this manner the temperature of the surface S may be accurately controlled in accordance with the preselected temperature of the pyrometer housing 111.

From the foregoing it may be seen that the present invention is readily adaptable both for measuring the temperature of a body and/or controlling the temperature of a body in accordance with a preselected temperature value, and that such measurement and/or control of the body temperature may be accomplished in avoidance of errors due to the presence of absorbing gases, vapors, and/or solid particles, and non-uniform emissivity by establishing black-body conditions of measurement and specifically by forming a black-body cavity or isothermal enclosure in which an area of the body or work surface comprises one wall thereof and the remaining walls are formed by an extension of and/or the interior of a radiation pyrometer.

While the modifications of the invention illustrated in Figs. 1–3 have been described in connection with total radiation pyrometers of the thermopile type, it shall be understood that other forms of radiation pyrometers or suitable optical pyrometers may also be used if desired.

In connection with Fig. 4, one form of the invention has been described as applied to an automatic measuring system. It will be apparent to those skilled in the art that the arrangement shown therein is not limited to measurement alone but may readily include control as well as measurement by providing the thermocouple recorder 55 with a controller for controlling the heat input to the work in manner explained in U. S. Patent No. 2,096,064, Ross et al.

In the several forms of the invention it is to be observed that the radiant energy directed to the work surface or body whose temperature is to be measured is limited to an area thereof which is small compared to the total area. The important consideration is that the added beam of radiant energy though it may be of relatively high intensity, will fall upon a limited area of the work surface and in consequence will not change the temperature of the work surface to any measurable degree. By referring to the limited area of the work surface, it is intended also to take into account the mass of the body or work whose temperature is to be measured since, for a rod, the area at the end thereof might be utilized as a limited area of the work and though comprehending the entire area of one face would be small in area as compared with the entire area of the rod. Nevertheless, radiant energy added thereto would not measurably affect the temperature of the rod. In the same manner, the auxiliary surface or the auxiliary source of radiant energy also has an area which is small compared with that of the work surface.

In the specification and claims the term "heated body" is used to define a body from which radiant energy is emitted, whether or not associated with heating means, and the reference in the claims to control of the heating of the pyrometer housing or to the control of the heating of the illuminator is to be taken as generic to either a heating or a cooling means associated therewith, or both, depending upon the direction of the temperature change required to bring the auxiliary surface, whether the housing or the illuminator, to the same temperature of the object whose temperature is to be measured.

It shall be understood the invention is not limited to the specific arrangements shown, and that changes and modifications may be made within the scope of the appended claims.

What is claimed is:

1. An apparatus for accurately measuring the temperature of a heated body, having an emissivity less than unity, without physical contact therewith and in avoidance of errors due to variable emissivity comprising an auxiliary surface, means for supporting said auxiliary surface adjacent said heated body to permit an interchange of radiant energy therebetween, said auxiliary surface having an emissivity of approximately unity, means for generating heat substantially uniformly throughout said auxiliary surface, a pair of radiation-responsive devices connected differentially for viewing said surface and said body, a detector for producing a null deflection when the intensities of the effective radiation from said heated body and from said auxiliary surface are equal, means responsive to said detector for adjusting said heat generating means until there is null deflection by said detector, and means for measuring the temperature of said auxiliary surface as a replica of the temperature of said heated body when there is said null deflection of said detector.

2. An apparatus for measuring the temperature of a body comprising a housing which is closed except for one open end thereof, said open end having a formed absorbing surface thereon and a configuration complementary to that of an area of said body for disposition in close proximity thereto in avoidance of entry into the housing of radiation from other than said body, a thermopile disposed within said housing and including at least one thermocouple having the hot junction midway of the housing and the cold junction intimately thermally in contact with an inner wall of the housing, optical means for focusing on the hot junction of the thermopile radiation from an area of said body, a heater for heating said inner wall of said housing, means including means responsive to difference between the temperatures of said hot and cold junctions for controlling said heater to bring the temperature of said cold junction to the temperature of said hot junction at which time the thermopile output is zero, and means for measuring the temperature of said cold junctions.

3. In a radiation pyrometer for measuring the temperature of a hot body, comprising in combination, a structure formed of metal of good heat conductivity and forming a housing with a cavity therein open at one side of said housing so that when said one side is alongside said hot body the latter may radiate heat into said cavity and may substantially prevent radiation of heat into said cavity from other sources, said housing being also formed with a thermopile chamber and with a passage through which heat is radiated from said cavity into said chamber, a thermopile in said chamber having its hot junction exposed to radiation through said passage and having its cold junction in good heat transfer relation with said structure, the improvement which consists in adjustable heat transfer means in heat transfer relation with said housing and regulating means actuated by said thermopile to adjust said heat transfer means as required to maintain the temperature of said housing in predetermined relation with the temperature of said body.

4. In a radiation pyrometer for measuring the temperature of a body, comprising in combination a structure formed of metal of good heat conductivity and having an opening therein at one side of said structure so that when said one side is alongside said body a measuring zone is established between said one side and said body and the latter may radiate heat into said opening and may substantially prevent radiation of heat into said opening from other sources, said opening communicating with a thermopile chamber through a passage through which heat is radiated from said opening into said chamber, and a thermopile supported in said chamber, having its hot junctions exposed to radiation through said passage, having its cold junctions in good heat transfer relation with supporting means within said chamber and in good thermal contact with said structure, and having output terminals between which said thermopile is adapted to produce an output voltage dependent in magnitude upon the difference between the temperatures of said hot and cold junctions, the improvement which consists in means adapted to insure black body measuring conditions in said zone, comprising heater means arranged in good thermal relationship with said structure and said supporting means, and control means connected to said output terminals, adapted to connect said heater means to a source of energization therefor, and operative to control the energization of said heater means in accordance with the magnitude of said output voltage as necessary to maintain said hot and cold junctions normally at the same temperature, thereby to maintain equality between the temperatures of said structure and said body.

5. An emissivity-independent pyrometer system for use with an adjustably heated work surface to produce black body conditions for true temperature measurement of the heated work surface comprising a heated illuminator, said illuminator having an effective emissivity of approximately unity, means supporting said illuminator with one surface thereof adjacent a limited area of the heated work surface thereby to effect a cooperative relation between said surfaces for reflection by said limited area of radiant energy emitted by said illuminator, heat-responsive means having different electrical outputs for different heat inputs disposed to receive heat inputs separately and directly from said illuminator and said limited area of said work surface, the relative disposition of said heat-responsive means, said illuminator and the work surface being such that heat received by said heat-responsive means directly from said limited area of the work surface comprises a beam of radiant energy emitted thereby and radiant energy emitted by the adjacent surface of said illuminator and reflected from said limited area, the heat received by said heat-responsive means directly from said illuminator being in form which is representative of the true temperature of said illuminator, means responsive to said electrical outputs for determining when said heat inputs are of equal intensity, and means for adjusting the temperature of a selected one of said surfaces to vary the intensity of said beam in accordance with the response of said means responsive to the difference in said electrical outputs for establishment of equality of said heat inputs and thus bring the intensity of said beam to equal that of a black-body beam emitted from said limited area under which conditions the temperatures of said surfaces are equal.

6. An emissivity-independent pyrometer system according to claim 5 for controlling the temperature of a heated work surface wherein said temperature adjusting means includes means to maintain said illuminator at a constant predetermined temperature and means to adjust the temperature of said work surface to bring the temperature of said work surface to the same temperature as that of said illuminator and establish equality of said heat inputs.

7. An emissivity-independent pyrometer system according to claim 5 for measuring the temperature of a heated work surface wherein said temperature adjusting means includes means to adjust the temperature of said illuminator to bring the temperature of said illuminator to the same temperature as that of said heated work surface and establish equality of said heat inputs, and means to indicate the temperature of said illuminator as a measure of said work surface temperature.

8. An emissivity-independent pyrometer system according to claim 5 wherein said illuminator comprises an electrically heated housing for said heat-responsive means, and said heat-responsive means comprises a thermopile having hot and cold junctions, said cold junctions being disposed in good heat-transfer relation with said housing, and said hot junctions being disposed to receive said beam from said limited area of said work surface.

9. An emissivity-independent pyrometer system according to claim 5 wherein said heat-responsive means comprises a pair of differentially connected radiation receivers respectively responsive to radiation from said illuminator and to said beam from said limited area of said work surface.

10. An emissivity-independent pyrometer system according to claim 5 including temperature-indicating means in good conductive heat-transfer relation with said illuminator for measuring the temperature of said illuminator.

11. Apparatus for measuring the true temperature of an adjustably heated work surface without physical contact therewith comprising an illuminator having a surface having effective unit emissivity to be positioned adjacent a limited area of said heated work surface thereby to effect a cooperative relation between said surfaces for reflection by said limited area of radiant energy emitted by said illuminator, a radiation pyrometer adapted to be sighted alternately in rapid succession on said limited area and on said illuminator to obtain electrical outputs from the beams of radiant energy respectively received from said limited area and from said illuminator, the relative dispostion of said radiation pyrometer, said illuminator, and the work surface during measurement being such that the beam of radiant energy received by said radiation pyrometer directly from said limited area of the work surface comprises both radiant energy emitted thereby and radiant energy emitted by the adjacent surface of said illuminator and reflected from said limited area, means for adjusting the temperature of said illuminator to vary the intensity of both of said beams until there is no difference in said electrical outputs for establishment of equality of the intensity of said beams at which time the temperature of said illuminator and said limited area will be equal and the intensity of the combined emitted and reflected radiant energy from said limited area will be equal to the intensity of the radiant energy of the beam from said illuminator, whereby upon sighting said radiation pyrometer on either said limited area or said illluminator there may be obtained an indication of the true temperature of said work surface.

References Cited in the file of this patent

UNITED STATES PATENTS

| | | |
|---|---|---|
| 2,127,889 | Schenk et al. | Aug. 23, 1938 |
| 2,302,554 | Kingsbury | Nov. 17, 1942 |
| 2,305,396 | Volochine | Dec. 15, 1942 |
| 2,501,446 | Justice | Mar. 21, 1950 |

OTHER REFERENCES

Hall: "Radiant Heat and Its Application," Technical Association Papers, series XXV, 1942, pages 213–217.

Sosman et al.: Metals Handbook of the ASME, 1948, page 182.

Publication, "Instrumentation," Minneapolis-Honeywell Regulator Co., vol. 3, No. 5, 4th quarter, 1948, page 24.